United States Patent [19]

Tokuda et al.

[11] Patent Number: 4,701,048
[45] Date of Patent: Oct. 20, 1987

[54] INPUT CIRCUIT FOR DISTANCE MEASURING APPARATUS

[75] Inventors: Ryuji Tokuda; Yoshihiro Harunari, both of Tokyo; Takashi Kobe, Kanagawa, all of Japan

[73] Assignee: Canon Kabushiki Kaisha, Tokyo, Japan

[21] Appl. No.: 581,958

[22] Filed: Feb. 21, 1984

[30] Foreign Application Priority Data

Feb. 23, 1983 [JP] Japan ................................ 58-29076
May 16, 1983 [JP] Japan ................................ 58-85500

[51] Int. Cl.$^4$ ........................ G01C 3/00; G01C 5/00; G03B 3/00
[52] U.S. Cl. ........................................ 356/1; 354/403; 356/222; 250/214 P
[58] Field of Search ................... 356/1, 222; 354/403; 250/214 P

[56] References Cited

U.S. PATENT DOCUMENTS

| 4,095,241 | 6/1978 | Matsumoto | 354/403 |
| 4,096,491 | 6/1978 | Wagensonner et al. | 354/434 |
| 4,490,036 | 12/1984 | Anagnostopoulos | 354/403 |
| 4,681,441 | 7/1987 | Uchidoi et al. | 356/222 |

Primary Examiner—Stephen C. Buczinski
Attorney, Agent, or Firm—Toren, McGeady & Associates

[57] ABSTRACT

An input circuit which converts currents produced from a plurality of photo-sensitive elements arranged in a distance measuring apparatus. The input circuit has a switching element series connected to at least one of the photo-sensitive elements. When the switching element is operated, the output current of one of the photo-sensitive elements is supplied to a converting circuit which converts current into a voltage. Only one converting circuit is present. The output of the converting circuit is produced in a time series to a computing circuit. The computing circuit processes the signal thus received and produces a signal corresponding to an object distance.

32 Claims, 20 Drawing Figures

FIG. 18

INPUT CIRCUIT FOR DISTANCE MEASURING APPARATUS

BACKGROUND OF THE INVENTION

1. Field of the Invention

This invention relates to a distance measuring apparatus adapted for automatic focusing in compact equipment such as a camera and more particularly to an input circuit for apparatus in which an energy such as light is projected from a light projecting part onto a distance measuring object. Then reflection energy reflected by the object is received by a plurality of sensor elements arranged away from the light projecting part by a base length, and the outputs of these sensor elements are computed to obtain the distance to the object.

2. Description of the Prior Art

Known distance measuring methods include a light irradiating type called the light active, trigonometric distance measuring method in which light is projected from a light projecting part onto the distance measuring object and a reflection light reflected by the object as a result of the light projection is received by a light receiving part disposed away from the light projecting part by a predetermined base length. The methods also include a trigonometric distance measuring method called the active type. For these distance measuring methods, there have been proposed and actually employed various methods for eliminating the necessity of a moving part by means of a plurality of sensor elements. These methods are advantageous in that distance information is obtainable prior to a photo-taking operation. However, these known methods have the following shortcoming: In these prior art methods, as typically seen in Japanese Patent Application Laid-Open No. SHO 56-29110, an input circuit includes the same number of amplifiers as the photo-sensitive elements for processing the outputs of these elements by comparing and computing them. This necessitates expansion of the circuit arrangement scale. Although advancement in the integrated circuit technology makes such a large circuit arrangement feasible, it inevitably results in a complex structural arrangement and an increase in cost.

On the other hand, to reduce the circuit arrangement scale, a method for distance measurements has also been proposed in which, as disclosed in Japanese Utility Model Publications Nos. SHO 55-2401 and SHO 56-11051, two light sensitive elements are either parallel or series connected in opposite directions in such a manner as to offset the output currents of these elements and to measure the object distance by obtaining the difference between them. In this case, however, what is obtainable is limited to difference information, while absolute distance information is barely obtainable. Such a method thus necessitates the auxiliary use of a moving part such as a servo mechanism.

SUMMARY OF THE INVENTION

An object of the present invention is to provide an input circuit for a distance measuring apparatus which never causes any increase in the size of an information processing circuit, even when the amount of input information increases.

Another object of the invention is to provide an input circuit for a distance measuring apparatus which is never affected by the leakage currents of photo-sensitive elements.

It is a further object of the invention to provide an input circuit for a distance measuring apparatus which is never affected by voltage variations of a power source.

These and further objects and features of the invention will become apparent from the following detailed description of preferred embodiments thereof taken in conjunction with the accompanying drawings.

In summary the invention comprises:

A signal processing device for a distance measuring apparatus including single signal converting means which has input terminals and converts photo currents into voltages, first photo-sensitive means connected to the input terminal of the single signal converting means, the first photo-sensitive means being arranged to generate photo current corresponding to a distance to an object, second photo-sensitive means for generating photo current corresponding to the distance to the object, and first switching means series connected to the second photo-sensitive means. The first switching means selectively connects the second photo-sensitive means to the input terminal of the signal converting means.

DETAILED DESCRIPTION OF THE PREFERRED EMBODIMENTS

Figure 1:
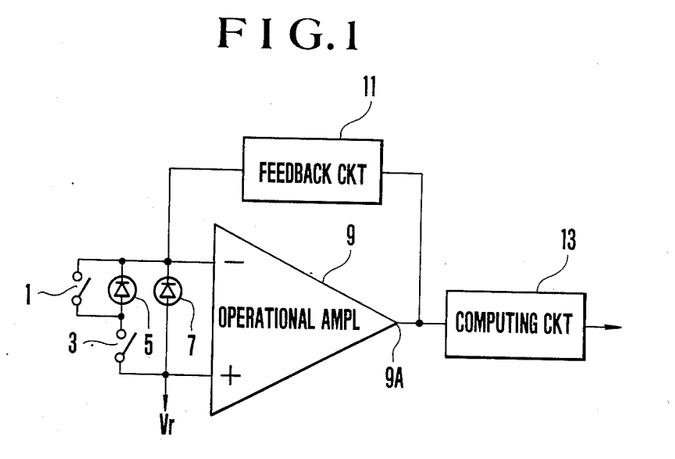
FIG. 1 is a circuit diagram showing an embodiment of the present invention as applied to a distance measuring apparatus.
Figure 2:
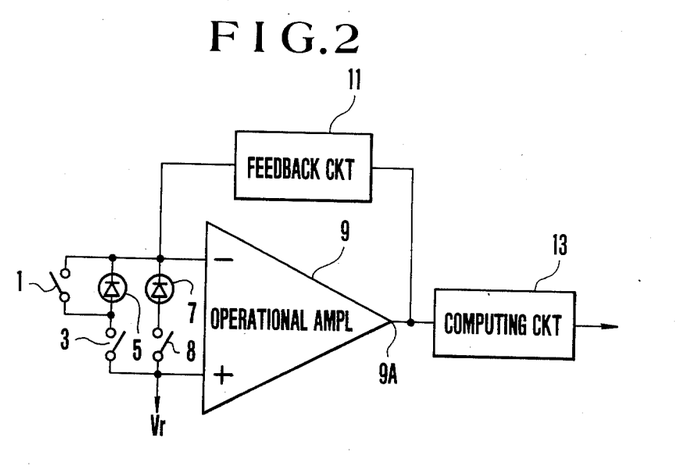
FIG. 2 is a circuit diagram showing another embodiment of the invention.
Figure 3A:
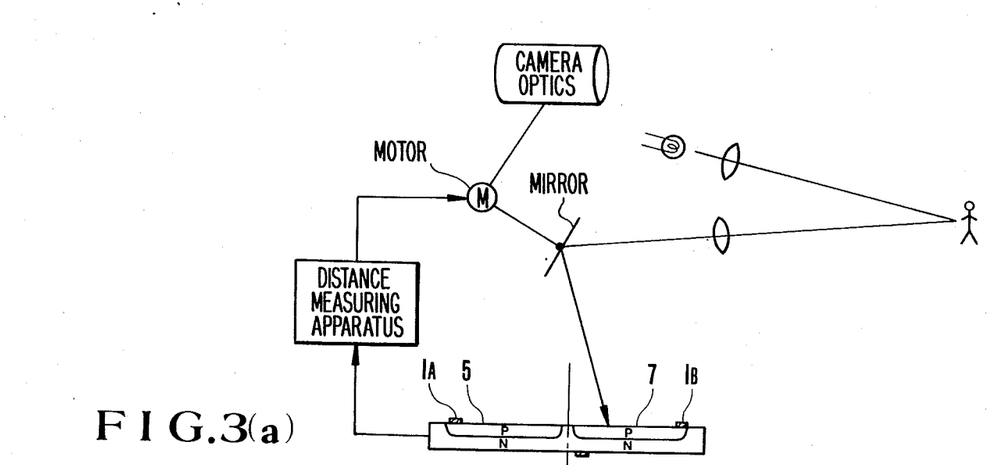
FIG. 3(a) is a schematic illustration showing the specific arrangement of photo-sensitive elements employed in the first embodiment shown in FIG. 1

Referring to FIG. 1 which shows circuit connections of an embodiment of the present invention, the embodiment includes a switch 1 which is connected parallel to a silicon photo diode 5 which is employed as a sensor element; a switch 3 which is series connected to the diode 5; and a silicon photo diode 7 which is connected as a sensor element to the input terminal of an operational amplifier 9 which has a MOS input element and is arranged as a signal converting circuit. The anode of the diode 7 is connected to a reference voltage source Vr which gives an operation voltage to the amplifier 9. The sensor elements 5 and 7 are arranged, for example, in such a manner as shown in FIGS. 3D–3G of U.S. Pat. No. 3,820,129. The embodiment further includes a feedback circuit 11 which has a predetermined impedance; and a computing circuit 13 which is connected to the output terminal of the amplifier 9. The circuit 13 processes a signal produced from the output terminal of the amplifier 9 and stores and produces information of varied kind, as will be further described later herein. The computing circuit 13 includes a sample-and-hold circuit and a divider and may be arranged, for example, in such a manner as shown in the circuit of FIG. 1 of Japanese Patent Publication No. SHO 56-10561. The output of the computing circuit 13 is supplied to a distance information processing circuit (not shown) and to be produced therefrom as distance information to a device (not shown). For the sake of a simplified description, the details of the above distance information processing circuit and the device are omitted herein. With the embodiment arranged in this manner, it operates as follows:

First, when the switch 1 is turned off and the switch 3 is turned on, the photo-sensitive elements 5 and 7 produce photo currents according to the intensity of light incident on them. The photo currents thus produced are converted to voltages by the feedback circuit 11 and the operational amplifier 9. Assuming that an output voltage corresponding to the output current of the photo-sensitive element 5 is "a" and another output voltage corresponding to that of the other photo-sensitive element 7 is "b", an output terminal 9A of the amplifier 9 produces a signal voltage of a value (a +b). If, conversely, the switch 1 is turned on and the switch 3 is turned off, the photo current produced from the photo-sensitive element 7 is solely converted by the feedback circuit 11 and the operational amplifier 9 which jointly form a signal converting circuit. In that instance, the output terminal 9A of the amplifier 9 produces a signal voltage of a value "b". These signal voltages (a +b) and "b" are produced from the amplifier 9 in a time seriated manner. Therefore, the computing circuit 13 computes either the signal voltage (a +b) or "b" or, if necessary, the signal voltage of a value (a +b)−b=a, (a+b)−2­b=a−b, 2b−(a+b)=b−a, a×b, a/b, a/(a+b), b/(a+b), or the like. The information thus obtained by computation is supplied to the distance information processing circuit (not shown). The distance information processing circuit then produces distance information of a value corresponding to the computed information. Furthermore, as shown in FIG. 2, another switch 8 may be connected in series to the photo-sensitive element 7. In this case, the signal voltage "a" can be singly produced from the output terminal 9A of the amplifier 9 by operating the switches 1, 3 and 8 in a suitable manner.

Figures 3B, 3C:
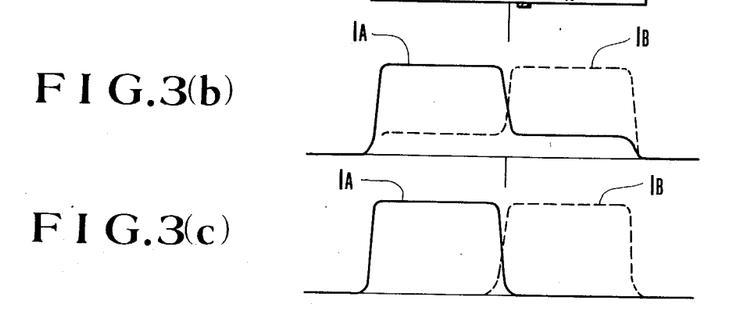
FIGS. 3(b) and 3(c) are illustrations of the operation of the first embodiment.

Theoretically stated, the operation of the arrangement shown in FIG. 1 requires only the switch 3, and the switch 1 is not necessary. However, in an apparatus that is arranged to perform distance measurement using two photo-sensitive elements 5, 7 as in the case of this embodiment, a physical gap between the two photo-sensitive elements 5 and 7 must be as small as possible in order, to equalize their characteristics and to minimize their dark currents. To meet this requirement, the two photo-sensitive elements 5 and 7 are normally formed on one chip in the manner shown in FIG. 3(a). As shown therein, light from a light reflected from the object is directed by a pivotable mirror to the photo-sensitive elements 5 and 7. The signals therefrom are processed in the distance measuring circuit to drive, for example, motor M, which adjusts the position of the mirror and the focusing of the camera optics. With these elements 5, 7 arranged in this manner, if only the switch 3 is provided, when light impinges upon the photo-sensitive element 5 while the switch 3 is turned off, the other photo-sensitive element 7 also produces an output current at a rate of some 20 or 30% of that of the photo-sensitive element 5. This is considered to be a leak attributable to the absence of a circulatory loop for the current produced from the photo-sensitive element 5. To prevent the leak, the embodiment shown in FIG. 1 is provided with the switch 1. With the switch 1 added and with the output of the photo-sensitive element 5 circulating through the switch 1, the leakage current disappears as shown in FIG. 3(c). Furthermore, although it is not shown in the drawing, the leakage current might also be attributed to the influence of a capacity part between the anodes of the photo-sensitive elements 5 and 7. However, since both of the terminals of the photo-sensitive element 7 are connected to both the positive and negative input terminals of the amplifier 9 with the switch 1 provided, the element 7 is stabilized at a zero voltage by an imaginary short-circuit. The two terminals of the other photo-sensitive element 5 are also short-circuited by the switch 1. Therefore, the element 5 is also stabilized at a zero voltage. Accordingly the voltage between the two terminals of the above-stated capacity is also stabilized. The leakage current can be prevented, since the circuit remains unaffected by the capacity part between the anodes of the photo-sensitive elements 5, 7 by virtue of the switch 1.

Figure 4:
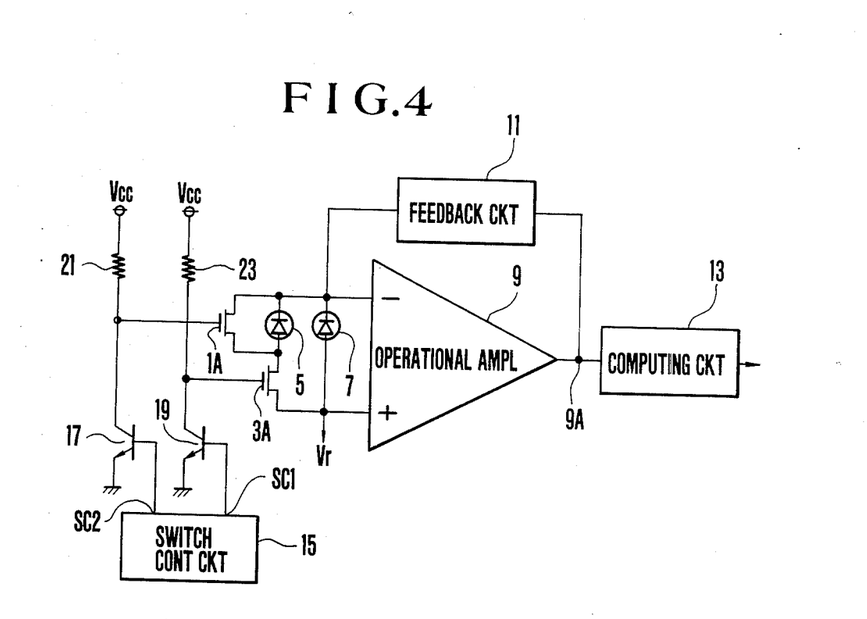
FIG. 4 is a circuit diagram showing a third embodiment of the invention.

FIG. 4 shows an example wherein analog switches 1A and 3A of MOS-FET's (field-effect transistors) are employed in the same manner as the switches 1 and 3 of FIG. 1.

Figure 5:
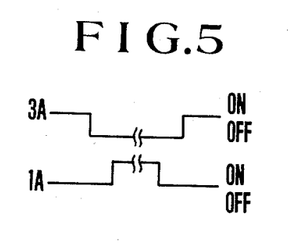
FIG. 5 is an illustration of the operation of the third embodiment shown in FIG. 4.
Figure 6:
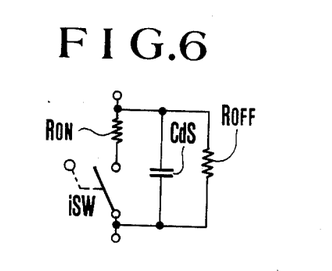
FIG. 6 is a circuit diagram showing the equivalent circuit of a switch shown in FIG. 4.

FIG. 5 is a chart showing the on-off operation timing of the switches 1A and 3A of FIG. 4. Referring to FIG. 4, if the switches 1A and 3A are simultaneously turned on, an input offset voltage causes excessive currents to flow via the switches 1A and 3A. This would saturate the output of the MOS-AMP 9 (or the operational amplifier 9). To avoid this, the embodiment shown in FIG. 4 is provided with a switch control circuit 15 which causes the switches 1A and 3A to be shifted to a predetermined condition after both of them are turned off. The switch control circuit 15 performs this function by controlling the gate voltages of gate voltage change-over transistors 17 and 19 provided for the switches 1A and 3A. The equivalent circuit of the switches 1A and 3A of FIG. 4, which are MOS-FET's, is arranged as shown in FIG. 6. Apart from the above-stated problem relative to the photo-sensitive elements 5, 7, each of the switches 1A and 3A has a capacity $C_{DS}$ between the drain and source thereof, an on-resistance $R_{ON}$ and an off-resistance $R_{OFF}$. When a minute current signal modulated by a photo-sensitive element 5, 7 is arranged to be taken out, a leakage current is produced due to the presence of the resistance $R_{OFF}$ and the capacity $C_{DS}$. In this embodiment, however, the arrangement of the switch 1A also effectively prevents such a leakage current. With the switch 1A turned on, the voltages of the two terminals of the switch 3A become almost zero. Therefore, no leakage current will be produced in the cases of both AC and DC, for the same reason mentioned in the foregoing.

Figure 7:
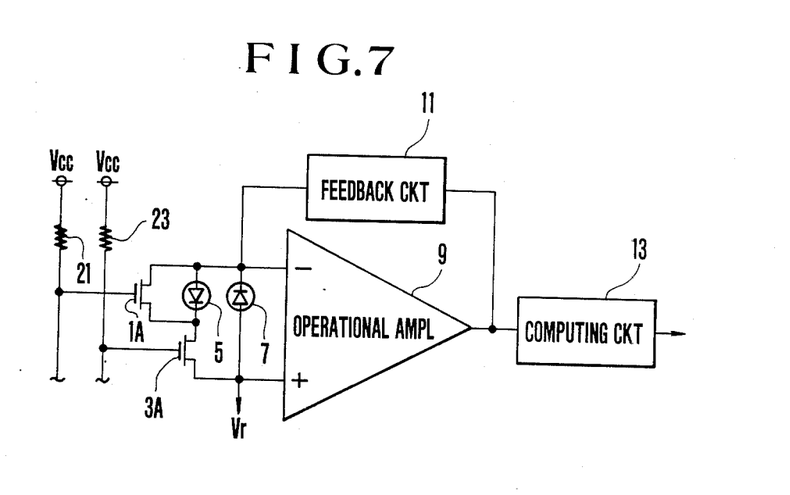
FIGS. 7-14 are circuit diagrams showing other embodiments of the invention.

FIG. 7 shows another example wherein the photo-sensitive elements 5 and 7 are antiparallel connected. The amplifier 9 produces from its output terminal 9A a signal voltage (b−a) when the switch 3A is turned on and the switch 1A is turned off and a signal voltage "b" when the switch 1A is turned on and the switch 3A is turned off. Furthermore, a signal voltage a is obtainable by computation from a signal voltage (b−(b−a)) and a signal voltage (a+b) from a signal voltage (2b−(b−a)). The rest of the arrangement and operation of the embodiment is identical to that of the embodiment shown in FIG. 4 and therefore requires no further description.

Figure 8:
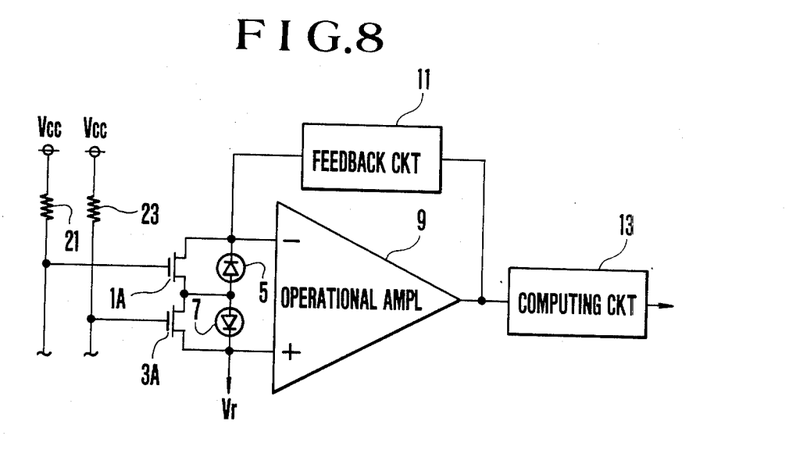

FIG. 8 shows an example wherein the two photo-sensitive elements 5 and 7 are conversely series connected. In this instance, a signal voltage "a" is obtained when the switch 3A is turned on and the switch 1A is turned off. A signal voltage "−b" is obtained when the switch 1A is turned on and the other switch 3A is turned off. In FIG. 8, a signal voltage "a" or "b" can be obtained with the photo-sensitive elements 5 and 7 connected in forward series with each other.

Figure 9:
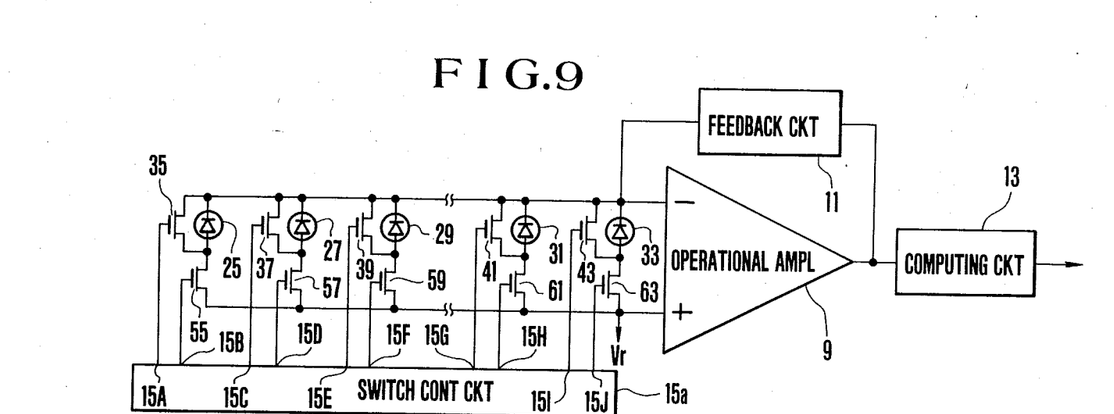

FIG. 9 shows an example wherein many photo-sensitive elements 25-33, which are similar to the photo-sensitive elements 5 and 7 of FIG. 4, are arranged with series switches 55-63 corresponding to the switch 3A of FIG. 4 and parallel switches 35-43 corresponding to the switch 1A of FIG. 4. In this case, either an output of a desired photo-sensitive element 25-33 can be singly obtained or a sum of the outputs of a combination of a desired number of photo-sensitive elements 25-33 can be obtained. The embodiment is provided with a switch control circuit 15a which is similar to the switch control circuit 15 of FIG. 4 and is provided with output terminals 15A-15J. These output terminals 15A-15J produce switching signals. The details the timing of operation of these output terminals 15A-15J are considered self-evident and, therefore, are omitted from description here. Other elements of the circuit are indicated by the same reference numerals as those shown in FIG. 4 and details are omitted from the description here.

Figure 10:
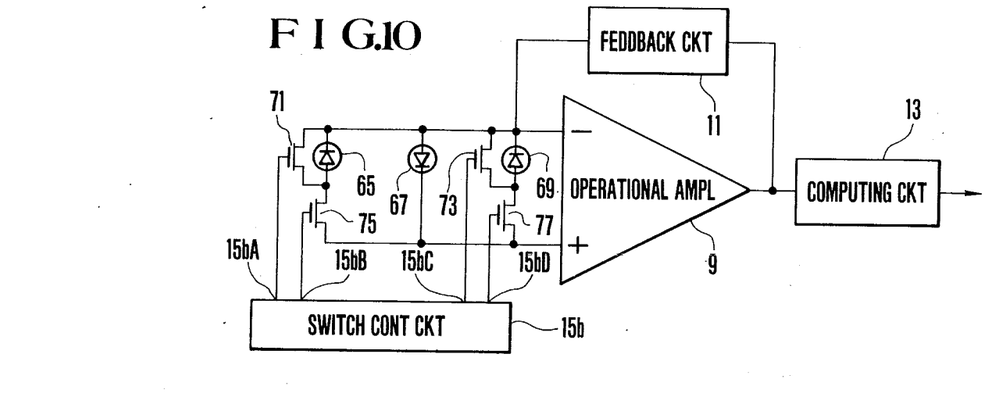

FIG. 10 shows an example wherein three photo-sensitive elements are used with one of them connected in the opposite direction. In this example, switches 1 and 73 and switches 5 and 77 are similar to the switches 1A and 3A of FIG. 4. When the switches 1 and 73 are turned on and the switches 5 and 77 are turned off by a switch control circuit 15b, a signal voltage (−b) which corresponds to a signal produced from a photo-sensitive element 67 is obtained. A signal voltage (a−b), which corresponds to the signals produced from the photo-sensitive elements 65 and 67, is obtained when the switches 75 and 73 are turned on and the switches 1 and 77 are turned off. A signal voltage (c−b), which corresponds to signals from the photo-sensitive elements 67 and 69, is obtained when the switches 71 and 77 are turned on and switches 75 and 73 are turned off. A signal voltage (a+c−b), which corresponds to signals produced from the photo-sensitive elements 65, 67 and 69, is obtained when the switches 75 and 77 are turned on and the switches 71 and 73 are turned off.

Figure 11:
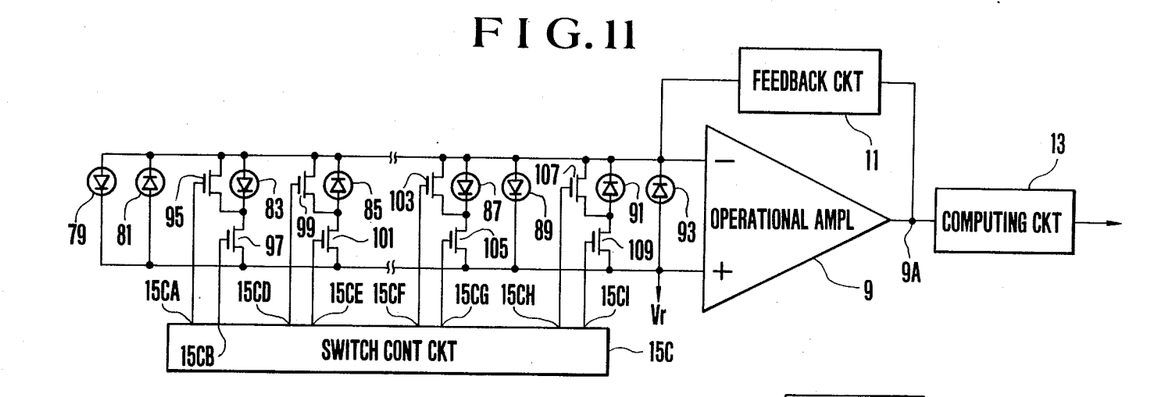

FIG. 11 shows an example wherein, among many photo-sensitive elements, elements 79, 83, 87 and 89 are connected in the opposite direction as shown in the drawing and switches are omitted for photo-sensitive elements 79, 81, 89 and 93, which are arranged to be constantly used. The arrangement of FIG. 11 represents an example of an application based on the embodiments shown in FIGS. 9 and 10. In FIG. 11, the photo-sensitive elements 79-93 are similar to the photo-sensitive elements 5 and 7 of FIG. 4. Switches 95-109 are formed by MOS-FET's which are similar to those of the switches 1A and 3A of FIG. 4. A switch control circuit 15c perform the same function as the switch control circuit 15 of FIG. 4. The timing of the switching operation of the group of switches 95-109 is thus controlled by this switch control circuit 15c. Other elements which are indicated by the same reference numerals as those used in FIG. 4 are arranged to perform the same functions as the corresponding elements of FIG. 4 and, therefore, require no further description.

Figure 12:
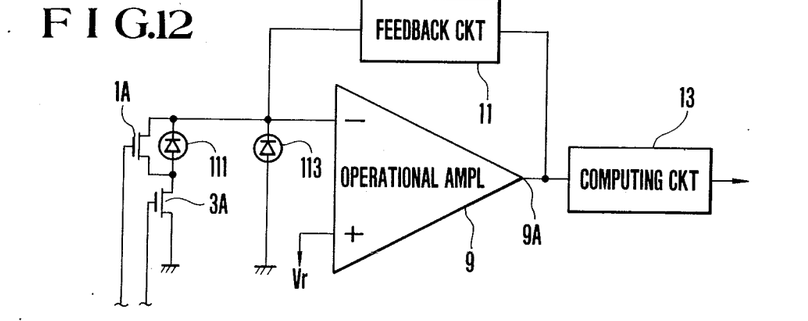

FIG. 12 shows an example wherein one terminal of each of photo-sensitive element 111 and 113 is connected to the ground instead of the input terminal of the amplifier 9 of MOS. Compared with the embodiment shown in FIG. 4, this arrangement of the example of FIG. 12 has the disadvantage of leakage current. However, the arrangement is advantageous in cases where one of the terminals of each of the photo-sensitive elements 111 and 113 cannot be connected to the input terminal of the amplifier 9 for some reason.

Figure 13:
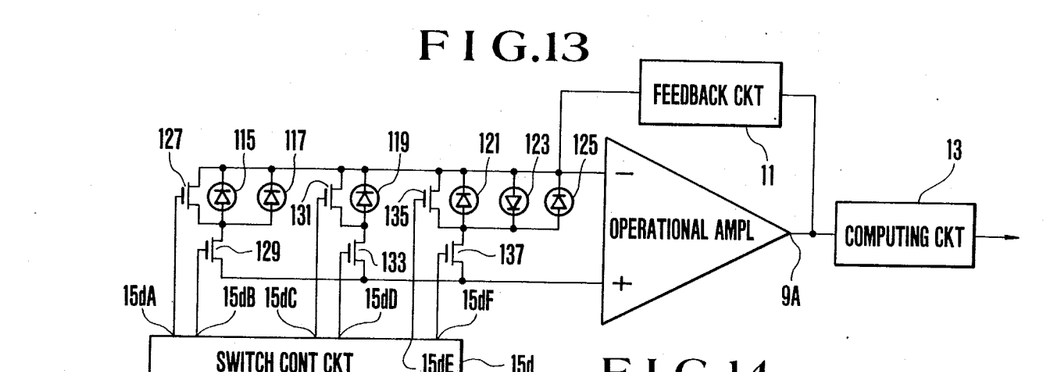

FIG. 13 shows another example wherein many photo-sensitive elements similar to those used in the embodiment shown in FIG. 9 are also employed. In this case, the photo-sensitive elements are divided into a plurality of groups. A first group consists of photo-sensitive elements 115 and 117. A second group consists of a photo-sensitive element 119. A third group consists of photo-sensitive elements 121, 123 and 125. To these groups of photo-sensitive elements 115 and 117, 119, 121, 123 and 125 are connected, in parallel and in series, pairs of switches 127, 129, 131, 135 and 137. The operation of these switches 127, 129, 131, 135, 137 is shifted by the output of a switch control circuit 15d, which is similar to the switch control circuit 15a of FIG. 9, to obtain a desired signal voltage from the amplifier 9. The grouping arrangement of this embodiment not only permits reduction in the number of switches 127, 129, 131, 135, 137 required but also permits simplification of the arrangement of the switch control circuit 15d.

Figure 14:
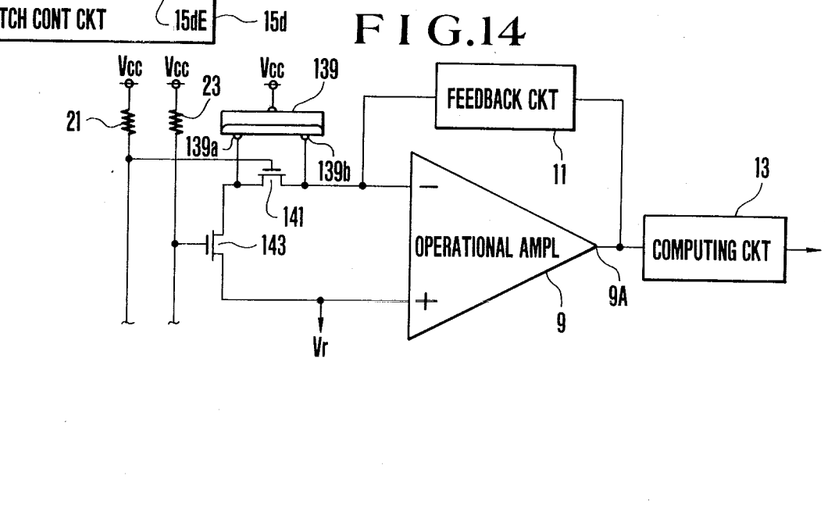

FIG. 14 shows a further example which includes a semiconductor position detector which is known, for example, from Japanese Laid-Open Patent Application No. SHO 57-177107, etc. (hereinafter called PSD for short). In this case, when switches 141 and 143 which are formed by MOS-FET's are turned on and off as desired, a sum signal voltage (a+b) is obtained from two detection terminals (electrodes) 139a and 139b. A single signal voltage "b" is obtainable by turning the switch 141 off and the other switch 143 on. Furthermore, it goes without saying that the signal from the PSD 139 can be completely cut off by inserting some switching means in series between one detection terminal 139b of the PSD 139 and the inversion input terminal (−) of the amplifier 9 of MOS. It is also, of course, possible to attain the same effect by connecting some switching means either to the two electrodes of the detector and/or in series between the electrodes.

In the foregoing description of embodiments, the operational amplifier 9 is described as preferably being an amplifier formed by an MOS using an MOS-FET as input means. However, in cases where a signal light incident upon the photo-sensitive element is important, the amplifier 9, of course, may be an ordinary operational amplifier having an input bias current.

Figure 15A:
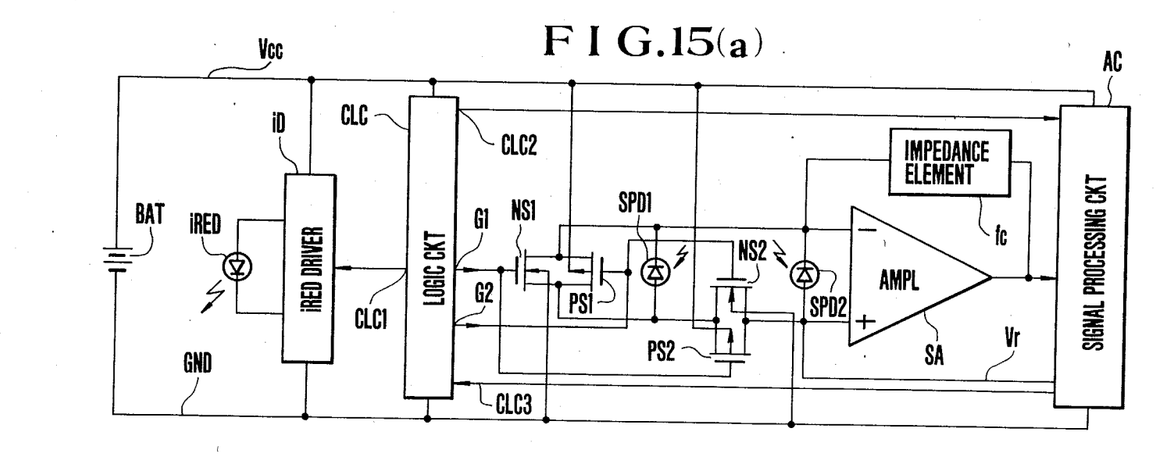
FIG. 15(a) is a circuit diagram showing a further embodiment of the invention.
Figure 15B:
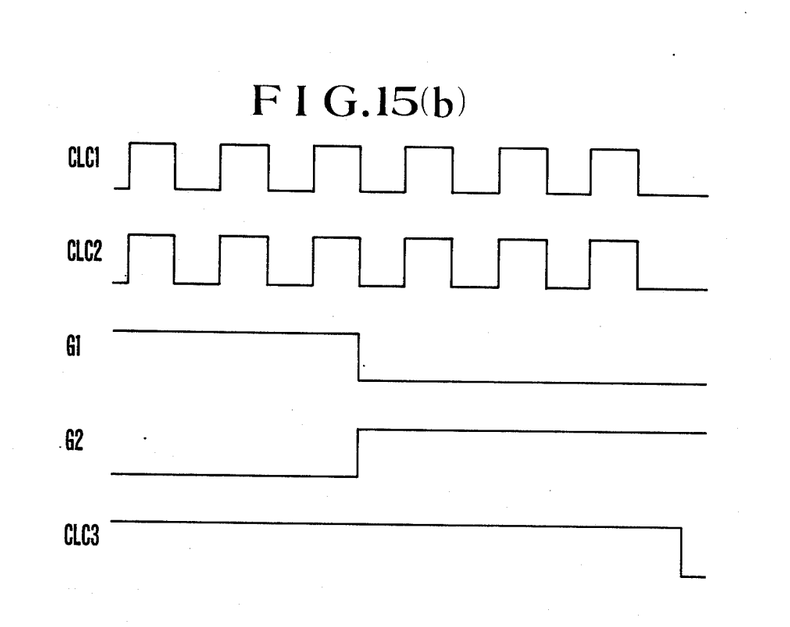
FIG. 15(b) is a time chart showing the operation of a logic circuit included in the circuit diagram of FIG. 15(a).

FIG. 15(a) is a circuit diagram showing essential parts of a distance measuring apparatus to which the present invention is applied in another embodiment. The circuit diagram of FIG. 15(a) includes a power source BAT such as a battery or the like which has an internal resistance. The positive electrode side of the power source BAT is connected to a line indicated by a reference symbol Vcc and the negative electrode side thereof to a line indicated by a symbol GND. An infrared ray emitting diode iRED is lit up and put out by an iRED driver iD based on a signal produced from a logic circuit CLC formed by a CMOS-FET. Silicon photo diodes SPD1 and SPD2 are sensors which convert to currents a reflection light incident thereon as a result of light projected by the diode iRED to the outside. The diode SPD1 has analog switches NS1 and PS1 which are formed by MOS type FET's connected in parallel thereto. Analog switches NS2 and PS2, which are formed by MOS type FET's, are series connected to the diode SPD1. An impedance element fC is connected to the feedback circuit of an amplifier SA. A signal line Vr gives a constant bias voltage to the amplifier SA. A signal processing circuit AC is connected to the output terminal of the amplifier SA and computes a distance to an object (not shown) on the basis of a signal produced from the amplifier SA. The circuit AC is arranged in a manner similar to the circuit 13 of FIG. 1. Of the MOS-type FET analog switches, the gates of the switches NS1 and PS2 are connected to a signal line G1 of the logic circuit CLC and those of the switches NS2 and PS1 to a signal line G2 of the circuit CLC respectively. The switches NS1 and PS1 become conductive and the switches NS2 and PS2 non-conductive when the signal line G1 is at a high level (hereinafter called HL for short) and the signal line G2 at a low level (hereinafter called LL for short). Conversely, the switches NS1 and PS1 become non-conductive and the switches NS2 and PS2 conductive when the signal line G1 is at an LL and the signal line G2 at an HL. The back gates of the switches NS1 and NS2 are connected to a line GND while those of the switches PS1 and PS2 are connected to the line Vcc. Referring now to FIG. 15(b), the signal lines G1 and G2 of the logic circuit CLC produce signals such as those shown in FIG. 15(b). The amplifier SA produces a signal corresponding to the sum of signals produced from the photo-sensitive elements SPD1 and SPD2 when the gates of switches NS1 and PS1 are off and the gates of switches NS2 and PS2 are on. The amplifier SA produces a signal corresponding to a signal from the photo-sensitive element SPD2 when the gates NS1 and PS1 are on and the gates NS2 and when PS2 are off. The rest of the operation of the embodiment is similar to the preceding embodiment and therefore requires no further description.

In this embodiment, when the element iRED is lit up and put out or flickered at predetermined intervals to project the light to the outside and to detect a resultant reflected light incident upon the elements SPD1 and SPD2 in an attempt to measure some object located outside, the voltage of the line Vcc varies as the load on the power source BAT varies to a great degree due to the flickering operation on the element iRED. The logic circuit CLC is receiving power supplied from the lines Vcc and GND. Therefore, due to the nature of the CMOS-type FET's forming the logic circuit CLC, the high output level of the logic circuit CLC becomes the voltage of the line Vcc and the low level thereof the voltage of the other line GND. Accordingly, one of the signal lines G1 and G2 which is at a high level produces a signal the voltage of which varies as the voltage of the line Vcc varies.

Figure 16A:
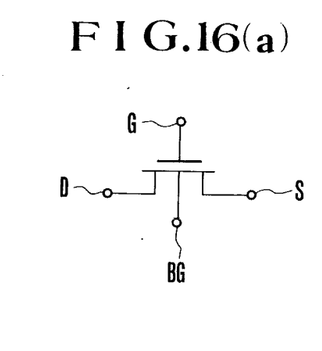
FIG. 16(a) is an illustration of an arrangement of an FET of the MOS type.
Figure 16B:
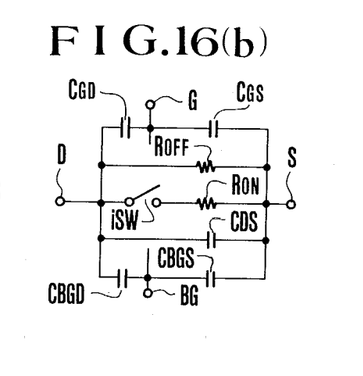
FIG. 16(b) is a circuit diagram showing the equivalent circuit of the FET of FIG. 16(a).

The characteristic of the analog switch when the amplitude of the signal voltage impressed on the gate thereof thus varies is as follows: Referring to FIG. 16(a) which shows one of the analog switches NS1, NS2, PS1, PS2, of FIG. 15(a), the analog switch consists of a gate G, a drain D, a source S and a back gate BG. The equivalent circuit of the analog switch is as shown in FIG. 16(b). The equivalent circuit includes an insulation resistance $R_{OFF}$; a conduction resistance $R_{ON}$; a capacity $C_{DS}$ between the source and drain; a capacity $C_{GS}$ between the gate G and the sources; a capacity $C_{GD}$ between the gate G and the drain D; a capacity $C_{BGS}$ between the back gate BG and the sources; a capacity $C_{BGD}$ between the back gate BG and the drain D; and an ideal switch isw. As will be readily understood from this, if the voltage impressed on the gate G or back gate BG (see FIG. 16(a)) varies relative to the drain D or the source S (see FIG. 16(a)), current flows from the gate G or back gate BG via the above-stated capacity part to the drain D or the sources.

Therefore, when the voltage impressed on the gate G or the back gate of the analog switch NS1, NS2, PS1, PS2 varies as the element iRED is flickered as mentioned in the foregoing, current flows from the signal line G1 or G2 via each capacity part shown in FIG. 16(b) to the input terminal of the amplifier SA which detects photo current. The current flow from the signal line G1 or G2 then causes an error signal to be produced from the amplifier SA. In the embodiment shown in FIG. 15(a), the error signal component thus produced is correlated with the true signal component and is extremely difficult to remove through the subsequent processing process. Particularly, when a method such as synchronous rectification or the like is used for signal processing, the true signal component becomes barely discernible. Therefore, it is necessary to have synchronous noise sufficiently lowered.

Figure 17A:
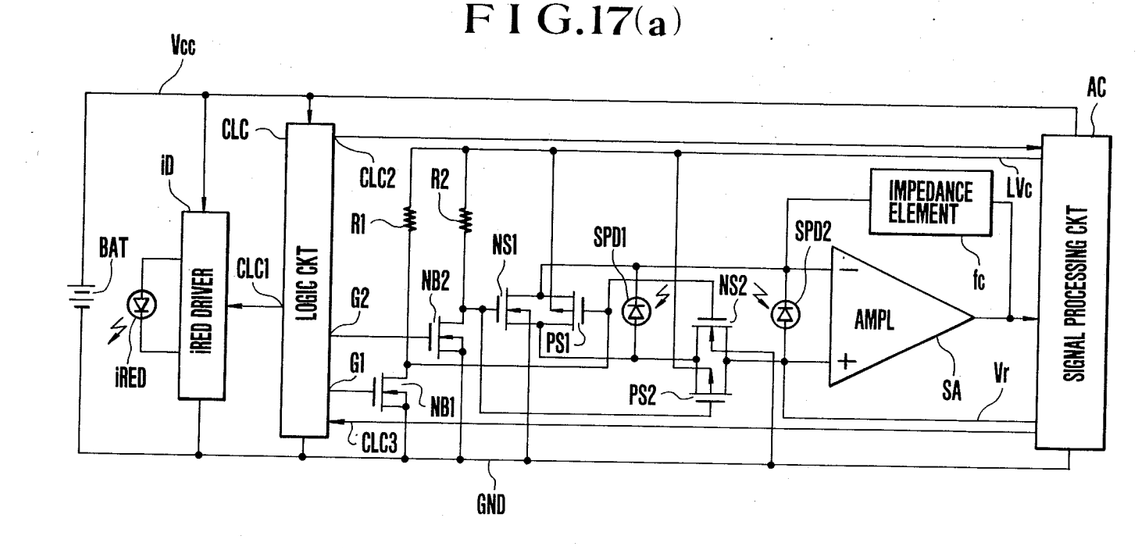
FIG. 17(a) is a circuit diagram showing a distance measuring apparatus to which the invention is applied.
Figure 18:
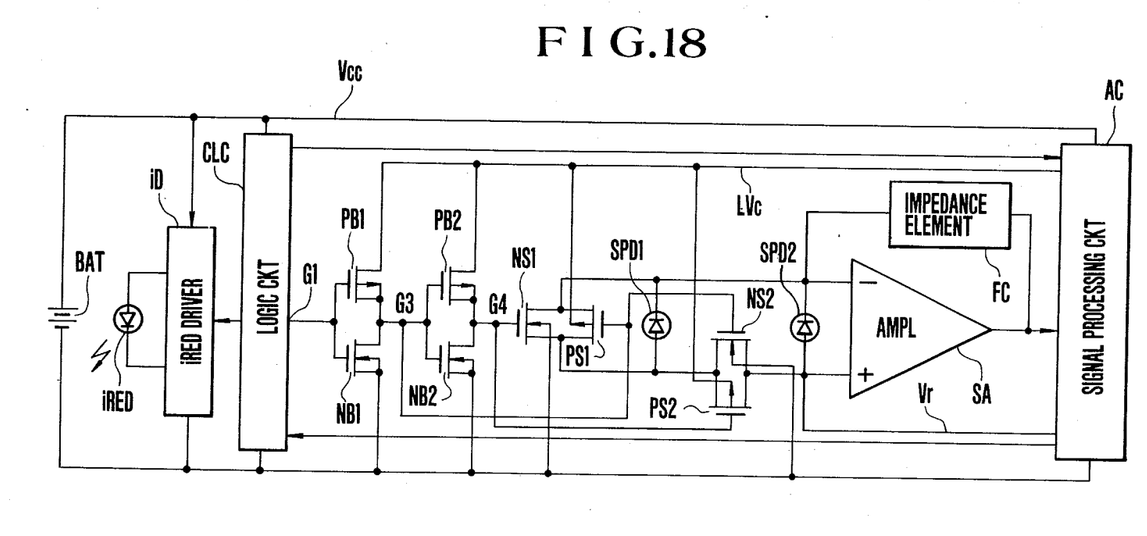
FIG. 18 is a circuit diagram showing a further embodiment of the invention.

FIGS. 17(a) and 18 show distance measuring apparatuses using analog switches formed by MOS type FET's which never produce any noise in response to changes in the power source voltage, even when the power source voltage fluctuates.

Figure 17B:
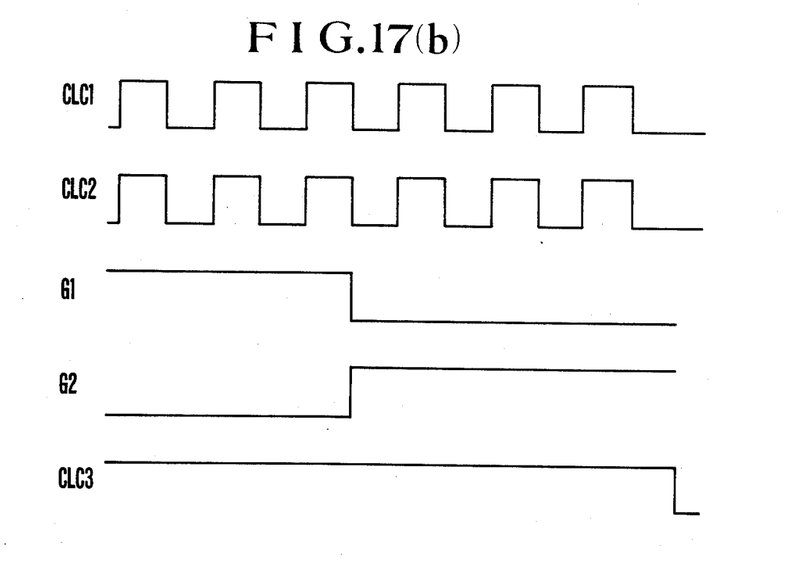
FIG. 17(b) is a time chart showing the operation of a logic circuit included in the circuit diagram of FIG. 17(a).

FIG. 17(a) shows in a circuit diagram the distance measuring apparatus arranged according to the invention in another embodiment. FIG. 17(b) is a time chart showing the operation timing of various parts of a logic circuit shown in FIG. 17(a). In FIG. 17(a), the elements performing the same functions as those of the corresponding elements shown in FIG. 15(a) are identified by the same reference numerals and symbols and are omitted from description here. The embodiment includes a signal processing circuit AC. The circuit AC is provided with a constant voltage source (not shown) which produces, on the basis of a band gap reference voltage, a voltage Vc which is stable even with variations in temperature and AC or DC power source voltage. The output terminal of this constant voltage source is connected to the back gates BG of the MOS-type FET analog switches PS1 and PS2 of a P channel. The output terminal is also connected to one terminal of each of resistors R1 and R2 which raise the gate voltages of the switches PS1, PS2, NS1 and NS2 up to the constant voltage Vc. Meanwhile, MOS-type FET analog switches NB1 and NB2 of an N channel which have their sources and back gates connected to the line GND have their drains connected to the other terminal of each of the resistors R1 and R2. The gates of the switches NB1 and NB2 are under the control of a logic circuit CLC arranged in a manner similar to the logic circuit CLC of FIG. 15(a), which is composed of CMOS-FET's. When these switches NB1 and NB2 are on, their drain voltages become the potential of the line GND. When they are off, the drain voltages become the potential of the line LVc. Signals to be supplied to and produced from the input and output terminals of the logic circuit CLC are as shown in FIG. 17(b). When the logic circuit CLC causes the gate voltage of the switch NB1 to become the voltage of the line Vcc and the gate voltage of the switch NB2 to become the voltage of the line GND, the part between the source and drain of the switch NB1 becomes conductive and the drain voltage of the switch NB1 becomes equal to the voltage of the line GND. Then, a voltage which varies due to the flicker of the element iRED is given to the gate of the switch NB1. However, since the source of the switch NB1 is connected to the ground line GND and the drain thereof to the line GND via the switch NB1's own channel, current which flows through capacity parts between the gate and drain and between the gate and source reaches the line GND. Therefore, the drain of the switch NB1 remains completely unaffected by the flicker of the element iRED. Meanwhile, at the switch NB2, since the voltage of the ground line GND is given to the gate, no current flows from the gate via the capacity parts. The part between the gate and source of the switch NB2 is thus brought into isolation. The resistor R2 then causes the drain voltage of the switch NB2 to become the voltage Vc of the line LVc. Under this condition, the voltage of the ground line GND is applied to the gates of the switches PS1 and NS2 and the back gates BG of the switches NS1 and NS2 while the voltage Vc of the power supply line LVc is applied to the gate G of the switches NS1 and PS2 and the back gates BG of the switches PS1 and PS2. Both of these voltages are constant without being fluctuated by the flicker of the element iRED. The switches NS1 and PS1 thus become conductive and the switches NS2 and PS2 non-conductive. The current generated at the sensor element SPD1 is thus short-circuited. In this instance, the voltages of all terminals that are related to the small currents of the sensors SPD1 and SPD2, the inversion (−) and non-inversion (+) input terminals of the amplifier SA, the drains D and sources S of the analog switches NS1, PS1, NS2 and PS2 and the gates and back gates BG of these analog switches NS1, PS1, NS1, PS2 arranged according to the invention all become constant. Accordingly, the voltages at both ends of the above-stated parasitic capacity parts (see FIG. 16(b)) existing in the structural arrangement of the MOS-type FET all become constant, allowing no current to flow through these capacity parts. Therefore, the current generated at the sensor element SPD2 is correctly transmitted to the amplifier SA and is converted into a voltage according to a constant determined by an impedance element fc.

When the logic circuit CLC causes the gate voltage of the switch NB1 to become the potential of the line GND and that of the switch NB2 to become the potential of the line Vcc, the switches NS1 and PS1 become non-conductive and the switches NS2 and PS2 conductive. Then, in the same manner as in the above-stated instance, a sum of the currents of the sensor elements SPD1 and SPD2 is transmitted to the amplifier SA to be converted to a voltage. The voltage thus obtained is then converted by the signal processing circuit AC into a signal representative of a distance to an object. Furthermore, when the resistors R1 and R2 are arranged on an IC in the form of diffused base type resistors, the noises of the analog swiches NS1, NS2, PS1, PS2, NB1, NB2 be further reduced by also applying a suitable constant voltage such as the above-stated constant voltage Vc to their epitaxial growth layers.

FIG. 18 shows a further embodiment, in which: The resistors R1 and R2 which are used in the embodiment shown in FIG. 17(a) are replaced with P-channel MOS type FET's PB1 and PB2, which are arranged in the form of a CMOS (complementary MOS). The gate signals of elements PB2 and NB2 are obtained from the output of a gate formed by elements PB1 and NB1. The back gates of the elements PB1 and PB2 are connected via a power supply line LVc which is similar to that of FIG. 17(a) to a constant voltage source (not shown) disposed within the signal processing circuit AC. The voltages of parts to which the drains of the elements PB1 and PB2 are connected become either the potential of the line Vcc or that of the line GND. With the embodiment arranged in this manner, it also produces no error signal, in the same manner as the embodiment shown in FIG. 17(a).

In this case, with the resistance loads R1 and R2 replaced with active loads of the elements PB1 and PB2, the period of time required for changing the voltages of the parts G3 and G4 from the level of the line GND to that of the line Vcc can be shortened and current consumption of the circuit arrangement can also be lowered. However, the voltage Vc in this case must be at a sufficiently high level to provide a sufficiently high back gate voltage for rendering the P-channel MOS conductive.

Although, theoretically speaking, a threshold voltage VT of an MOS type FET can be at any desired value, the voltage VT cannot be prevented from varying a great extent by the present level of the process technology. It thus becomes difficult to prepare with an IC the circuit arrangement of FIG. 18 at a high rate of yield according as the above-stated constant voltage Vc becomes lower.

The same remark also applies to the elements PS1 and PS2 which are P-channel MOS-type FET's forming analog switches. However, even if these two FET's fail to become conductive, the elements NS1 and NS2 alone adequately function as analog switches. Therefore, even in case that the variations of the voltages Vr and VT compel such arrangement as the one shown in FIG. 17(a), the addition of the elements PS1 and PS2 never brings about any adverse effect but rather serves to give some advantageous effect. Meanwhile, it is of course conceivable to omit the elements PS1 and PS2 from the arrangement of FIG. 17(a).

It is also possible to use bi-polar transistors for the elements NB1 and NB2 in the arrangement of FIG. 17(a) and for the elements NB1, NB2, PB1 and PB2 in the arrangement of FIG. 18.

In the distance measuring apparatus having a plurality of photo-sensitive elements and arranged according to the invention as has been described in the foregoing, the outputs of the photo-sensitive elements are shifted from one to another as desired; and the apparatus employs a dispersive method in which the photo-sensitive elements themselves or circuit elements connected thereto are arranged to perform addition or subtraction to give many information outputs. Besides, the arrangement of the invention permits reduction in size of the photo-sensitive element output processing circuits such as the signal conversion circuit 9 for the photo-sensitive elements, the computing circuit 13, etc.

Further, in accordance with the invention, the signal conversion circuit can be arranged into a single circuit, so that all signals can be processed within the same conversion circuit. Besides, the signals can be obtained in equal conditions including the current-to-voltage conversion constant, frequency characteristic, offset voltage, etc. The apparatus according to the invention thus gives a highly accurate signal or distance information.

In the case of the embodiments shown in FIGS. 15(a)-18, the back gate terminals of the analog switches formed by MOS-type FET's are connected to a constant voltage source while the control signal to be applied to the gate terminals of these analog switches is arranged to be of a stable, positive or negative voltage. This arrangement eliminates the noises attributable to the parasitic capacity parts inevitably resulting from the structural arrangement of the MOS-type FET's. Further, the shifting circuit which shifts such sensors as silicon photo diodes that produce minute currents from one to another to correctly transmit the signals of the sensors to a subsequent processing circuit can be arranged into an integrated circuit.

What we claim:

1. A signal processing device for a distance measuring apparatus having a light receiving portion in which a ratio of output current of first and second output portions varies in correspondence to a position of a received signal light, in which the signal light is projected and a reflection light thereof is received by the light receiving portion to detect the ratio of the output currents of the first and second output portions thereby judging the position of the received reflection light and the distance of an object is measured on the basis of the reflection light receiving position, and said processing device comprising:

(A) first and second light receiving means contstituting the light receiving portion for receiving the reflection light, said first and second light receiving means each outputting a current in correspondence to the amount of the reflection light received thereby, and the ratio of the output currents from said first and second light receiving means changing in correspondence to the receiving position of the reflection light;

(B) signal forming means for forming a signal in correspondence to the output currents from the first and second light receiving means;

(C) control means for controlling the inputting of the output current from the first light receiving means to the signal forming means; and (D) current path forming means for forming a current path around said first light receiving means to liberate a current leakage from the first light receiving means thereby preventing said current leakage from being inputted to the signal forming means when said control means cuts off the inputting of the output current from the first light receiving means to the signal forming means.

2. A signal processing device according to claim 1, in which the first and second light receiving means are arranged on a common chip.

3. A signal processing device according to claim 1, wherein said control means includes a switch connected in series to said first light receiving means.

4. A signal processing device according to claim 3, wherein said switch includes a MOS-FET.

5. A signal processing device according to claim 3, wherein said control means further includes a further switch connected in series to the second light receiving means.

6. A signal processing device according to claim 5, wherein said further switch includes a MOS-FET.

7. A signal processing device according to claim 6, wherein said switch includes a MOS-FET.

8. A signal processing device according to claim 1, wherein said current path forming means includes a switch connected in parallel to the first light receiving means.

9. A signal processing device according to claim 8, wherein said switch includes a MOS-FET.

10. A signal processing device according to claim 9, wherein said control means includes a further switch connected in series to said first light receiving means.

11. A signal processing device according to claim 10, wherein said further switch includes a MOS-FET.

12. A signal processing device according to claim 1, wherein said control means includes timing means for making a period in which the current path forming means is operative shorter than a period in which the output current from the first light receiving means is not inputted to the signal forming means so that the output current from the first light receiving means is completely cut off to the signal forming means for the period in which the current path forming means is operative.

13. A signal processing device according to claim 4, which further comprises constant voltage means for adding a constant voltage to the MOS-FET.

14. A signal processing device according to claim 13, wherein said constant voltage means includes a MOS-FET.

15. A signal processing device according to claim 9, further comprising constant voltage means for adding a constant voltage to the MOS-FET.

16. A signal processing device according to claim 9, wherein said constant voltage means includes a MOS-FET.

17. A signal processing device for a distance measuring apparatus a light receiving portion in which a ratio of output currents of first and second output portions varies in correspondence to a position of a received signal light, in which the signal light is projected and a reflection light thereof is received by the light receiving portion to detect the ratio of the output currents of the first and second output portions thereby judging the position of the received reflection light and the distance of an object is measured on the basis of the reflection light receiving position, said signal processing device comprising:

(A) first and second output portions constituting the light receiving portion to receive the reflection light, said first and second output portions each outputting a current in correspondence to the amount of the reflection light received and the ratio of the output currents from said first and second output portions changing in correspondence to the receiving position of the reflection light;

(B) signal forming means for forming a signal in correspondence to the output currents from the first and second output portions;

(C) control means for controlling the inputting of the output current from the first output portion to the signal forming means; and (D) current path forming means for forming a current path around said first output portion to liberate a current leakage from the first output portion thereby preventing said current leakage from being inputted to the signal forming means when said control means cuts off the inputting of the output current from the first output portion to the signal forming means.

18. A signal processing device according to claim 17, in which the first and second output portions are arranged on a common chip.

19. A signal processing device according to claim 17, wherein said control means includes a switch connected in series to said first output portion.

20. A signal processing device according to claim 19, wherein said switch includes a MOS-FET.

21. A signal processing device according to claim 19, wherein said control means includes a further switch connected in series to the second output portion.

22. A signal processing device according to claim 21, wherein said further switch includes a MOS-FET.

23. A signal processing device according to claim 22, wherein said switch includes a MOS-FET.

24. A signal processing device according to claim 17, wherein said current path forming means includes a switch connected in parallel to the first output portion.

25. A signal processing device according to claim 24, wherein said switch includes a MOS-FET.

26. A signal processing device according to claim 25, wherein said control means includes a further switch connected in series to said first output portion.

27. A signal processing device according to claim 26, wherein said further switch includes a MOS-FET.

28. A signal processing device according to claim 17, wherein said control means includes timing means for making a period in which the current path forming means is operative shorter than a period in which the output current from the first output portion is not inputted to the signal forming means so that the output current from the first output portion is completely cut off to the signal forming means for the period in which the current path forming means is operative.

29. A signal processing device according to claim 20, which further comprises constant voltage means for adding a constant voltage to the MOS-FET.

30. A signal processing device according to claim 29, wherein said constant voltage means includes a MOS-FET.

31. A signal processing device according to claim 25, further comprising constant voltage means for adding a constant voltage to the MOS-FET.

32. A signal processing device according to claim 25, wherein said constant voltage means include a MOS-FET.

* * * * *